US007131690B2

United States Patent
Bollaender et al.

(10) Patent No.: US 7,131,690 B2
(45) Date of Patent: Nov. 7, 2006

(54) HOLDING DEVICE FOR A BEVERAGE CONTAINER

(75) Inventors: Jochen Bollaender, Ingolstadt (DE); Torsten Bieck, Waldachtal (DE); Hans-Peter Stoll, Dornstetten (DE); Falk Schaal, Alpirsbach (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/915,408

(22) Filed: Jul. 26, 2001

(65) Prior Publication Data

US 2002/0008415 A1    Jan. 24, 2002

(30) Foreign Application Priority Data

Jul. 29, 2000    (DE) ............................... 100 37 058

(51) Int. Cl.
*A47C 7/62*    (2006.01)
(52) U.S. Cl. ......................... 297/188.17; 297/188.15; 248/311.2
(58) Field of Classification Search ........... 297/188.17, 297/188.16, 188.14, 188.15, 411.35; 248/311.2, 248/313, 118; 312/330.1, 333
See application file for complete search history.

(56) References Cited

U.S. PATENT DOCUMENTS

| | | | | |
|---|---|---|---|---|
| 4,652,029 A | * | 3/1987 | Yamamoto | 292/252 |
| 4,865,368 A | * | 9/1989 | McCall et al. | 292/175 |
| 5,379,978 A | * | 1/1995 | Patel et al. | 224/281 |
| 5,524,958 A | | 6/1996 | Wieczorek et al. | |
| 5,628,486 A | * | 5/1997 | Rossman et al. | 248/311.2 |
| 5,671,877 A | * | 9/1997 | Yabuya | 224/282 |
| 5,673,981 A | * | 10/1997 | Higashimata et al. | 303/155 |
| 5,678,896 A | * | 10/1997 | Chung | 297/411.38 |
| 5,692,718 A | * | 12/1997 | Bieck | 224/281 |
| 5,769,495 A | * | 6/1998 | Vairinen | 297/411.32 |
| 5,800,011 A | * | 9/1998 | Spykerman | 248/311.2 |
| 5,857,633 A | * | 1/1999 | Pelchat et al. | 248/311.2 |
| 5,876,007 A | * | 3/1999 | Lancaster et al. | 224/281 |
| 5,897,089 A | * | 4/1999 | Lancaster et al. | 224/926 |
| 6,283,551 B1 | * | 9/2001 | Bergin | 297/411.35 |
| 6,427,960 B1 | * | 8/2002 | Gehring et al. | 224/926 |
| 6,450,468 B1 | * | 9/2002 | Hamamoto | 248/311.2 |
| 6,666,485 B1 | * | 12/2003 | Moret | 292/130 |

FOREIGN PATENT DOCUMENTS

DE    196 16 774 A1    11/1997
JP    06336136 A    12/1994

* cited by examiner

*Primary Examiner*—Anthony D. Barfield
(74) *Attorney, Agent, or Firm*—Michael J. Striker (57) ABSTRACT

A holding device for a beverage container intended for installation in a holdable arm rest in a motor vehicle, has a carriage guidable as a drawer to be displaceable back and forth between a pushed-in position and a pulled-out position so that a beverage container can be inserted into the holding device when the carriage is in the pulled-out position, a guide for guiding the carriage during its displacement between the positions, a gravity locking device which locks the carriage in the pushed-in position when the carriage is not in an approximately horizontal position.

9 Claims, 7 Drawing Sheets

HOLDING DEVICE FOR A BEVERAGE CONTAINER

BACKGROUND OF THE INVENTION

The present invention relates to beverage containers. More particularly, it relates to beverage containers which are formed for example as a beaker, a cup or a beverage can.

The holding device is intended for installation in a folding arm rest in a motor vehicle, which arm rest is arranged between a driver's seat and a passenger's seat and can be pivoted back and forth between an approximately horizontal, use position and an upwardly oriented, non-use position. In the use position, the arm rest is located between the driver's seat and passenger's seat, and the driver and/or passenger can rest an arm on the arm rest. In the folded-up, non-use position, the arm rest is located between the backs of the driver's and passenger's seats.

Holding devices for beverage containers for installation, for example, in the dashboard of a motor vehicle are known. Such known holding devices have a carriage, which is so guided by a carriage guide means in the manner of a drawer as to be displaceable back and forth between a pushed-in position and a pulled-out position. The carriage is conventionally moved into the pulled-out position by spring force and is held in the pushed-in position against the force of a spring element using an unlockable locking device. It is possible to insert a beverage container into the holding device when the carriage is in the pulled-out position. For that purpose, the carriage or a holder attached thereto has an insertion opening, into which the beverage container can be inserted. The insertion opening supports the inserted beverage container laterally against tipping over. The beverage container stands on a support or supporting surface, which can be formed, for example, by the carriage.

The known holding devices are intended for installation in an unchanging, approximately horizontal position. When installed in a folding arm rest, the known holding devices-especially when they are moved into the pulled-out position by spring force-have the disadvantage that, when the arm rest has been folded up, they spring out in an upwards direction if they are (unintentionally) unlocked. That is, at the least undesirable.

SUMMARY OF THE INVENTION

Accordingly, it is an object of the present invention to provide a holding device for a beverage container, which can be pulled out only when in an approximately horizontal position.

The holding device according to the invention has a gravity locking device, which locks the carriage in the pushed-in position when the carriage is not in an approximately horizontal position. The gravity locking device ensures that the carriage can be pulled out only when the folding arm rest accommodating the holding device according to the invention is located in its approximately horizontal, use position. The invention prevents the carriage from springing out from the folded-up arm rest. The holding device according to the invention is not limited to installation in upwardly folding arm rests; it can in principle also be arranged in other components that can be folded, or pivoted, in an upward or downward direction.

In a preferred embodiment of the invention, the gravity locking device has a locking member, which is movably guided and which moves back and forth between a locked position and an unlocked position as a result of gravity in dependence upon the position of the carriage of the holding device. When the carriage is in its approximately horizontal position, gravity moves the locking member into the unlocked position, wherein the carriage of the holding device is movable and can be pulled out. When the carriage is not in its approximately horizontal position, for example because the folding arm rest has been folded up, gravity moves the locking member into a locked position, wherein the locking member locks the carriage immovably in the pushed-in position.

The locking member can be, for example, a pivotal bar, which pivots into the locked position as a result of gravity when the arm rest is folded up and which pivots into the unlocked position as a result of gravity when the arm rest is approximately horizontal.

In an embodiment of the invention, the holding device has a holder, which has an insertion opening for the beverage container and is raisably guided on the carriage by a guide means. When the carriage is pulled out, the holder is raised and, when the carriage is pushed in, the holder is lowered back onto the carriage. As a result of the holder being raised in the pulled-out position of the carriage, the spacing between the holder and the carriage is sufficient for an inserted beverage container to be securely supported laterally against tipping. As a result of the holder being lowered when the carriage is pushed in, the holding device can be of flat construction and consequently can be accommodated in space-saving manner in a shallow installation space. In accordance with the invention, the path of raising of the holder is oriented upwards in relation to the carriage and contrary to the pull-out direction of the carriage. As a result, when the carriage is pulled out, the holder exhibits no travel or at least a shorter travel in the carriage pull-out direction than the carriage. That has the advantage that the pull-out distance of the carriage can be shortened; the carriage and the holder project out less far from their installation space. The shortened pull-out distance is in itself advantageous because the holding device projects out less far into the passenger space when the carriage is pulled out. A further advantage is that, for example in the event of unintentional leaning on the pulled-out carriage, the shorter pull-out distance means that the lever arm (by way of which the load acts on the carriage) is shortened. That reduces the risk of the carriage breaking.

In an embodiment of the invention, the guide means of the holder has a four-lever mechanism, the carriage forming one lever and the holder forming an opposite lever of the four-level mechanism. The four-lever mechanism can form, for example, a parallelogram guide means, which raises the holder parallel to the carriage and lowers it onto the carriage. When the carriage is intended for installation in a sloping plane, that is to say when the displacement direction of the carriage is oriented in a sloping plane, the geometry of the four-lever mechanism can differ from a parallelogram so that, on raising, the holder pivots relative to the carriage.

In an embodiment of the invention, the insertion opening for the beverage container is provided so that it is modifiable in terms of its size. For that purpose, the holder has a movable, for example displaceable or pivotal, adjusting element, by means of which the size of the insertion opening can be modified. Furthermore, the holding device has a securing device for the adjusting element, which securing device secures the adjusting element in its position.

The securing device can be, for example, in the form of an adjusting element that is movable against a clamping force. In an embodiment of the invention, a catch device is provided as the securing device for the adjusting element, which device reliably secures the adjusting element in its position even after having been adjusted many times.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
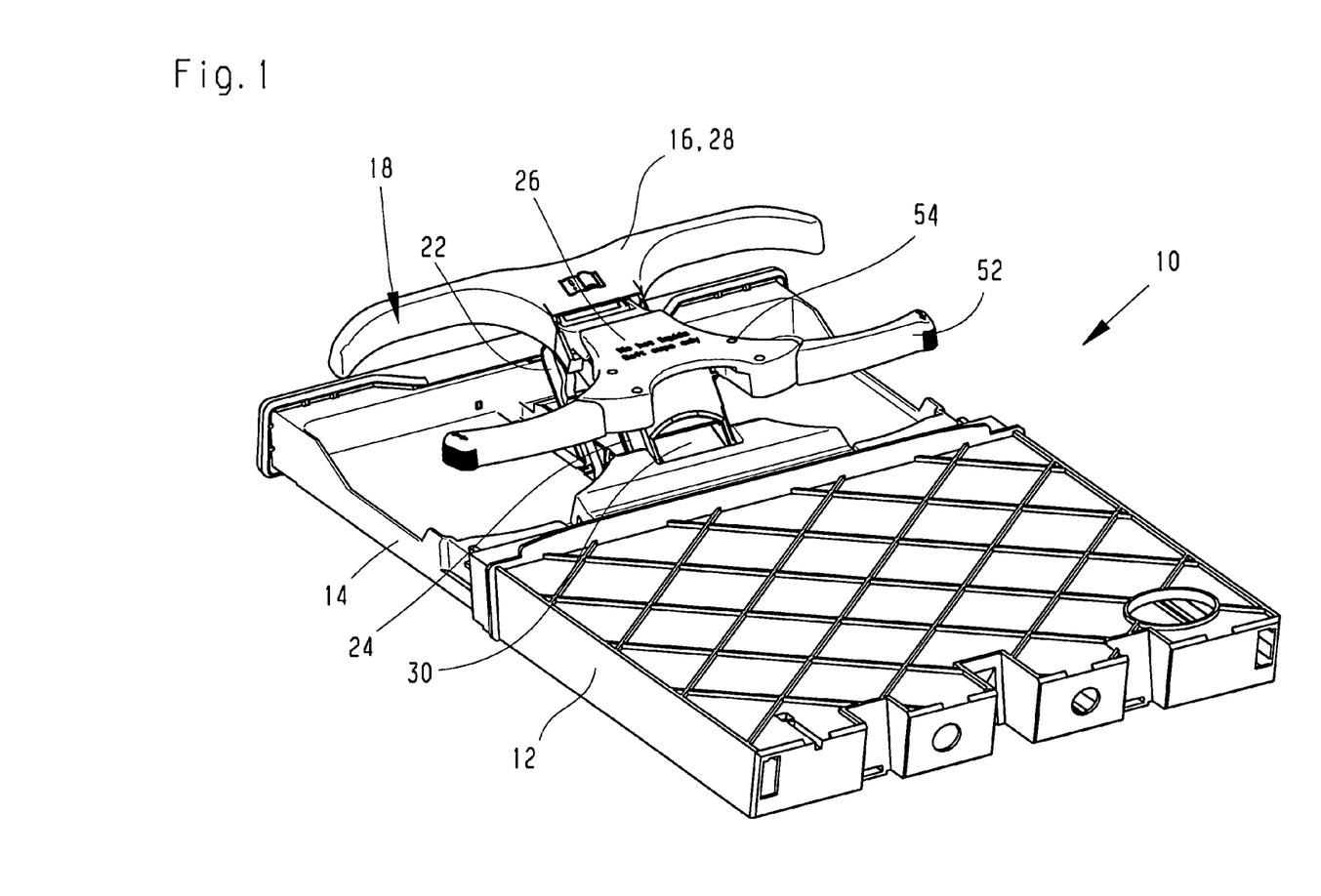
FIG. 1 shows a holding device according to the invention in an oblique perspective view from behind.
Figure 2:
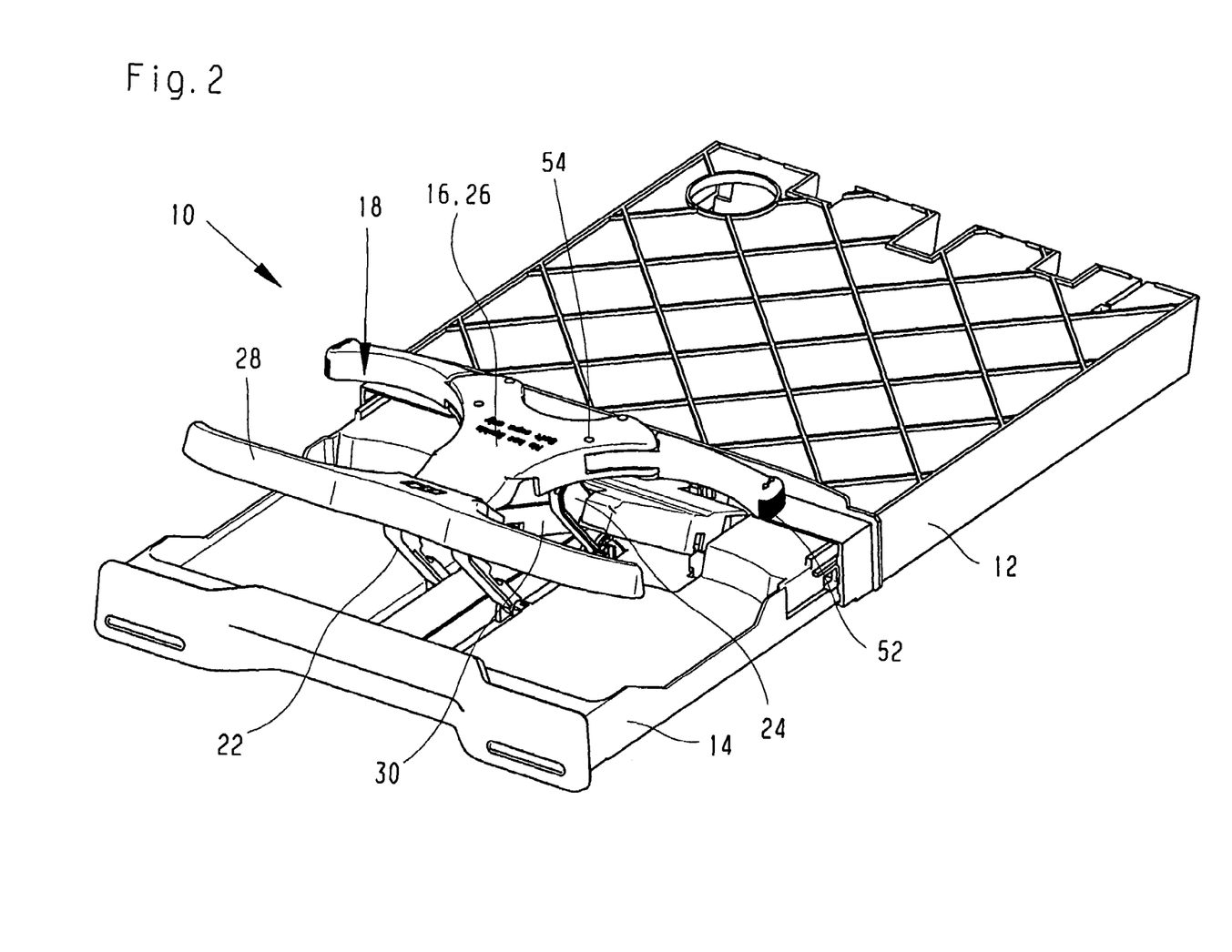
FIG. 2 shows the holding device of FIG. 1 in an oblique perspective view from the front.

The holding device 10 according to the invention shown in FIGS. 1 and 2 is intended for installation in the end face of a folding arm rest (not shown in FIGS. 1 and 2) in a motor vehicle. Such arm rests are arranged between a driver's and a passenger's seat in motor vehicles. They can be folded back and forth between an approximately horizontal, use position and an upwardly oriented, non-use position. In the approximately horizontal, use position, the arm rest is located between the driver's seat and the passenger's seat, and the driver and/or passenger can rest an arm on the arm rest. In the folded-up, non-use position, the arm rest is located between the backs of the driver's and passenger's seats.

The holding device 10 according to the invention has a flat, ribbed housing 12, which in plan view is rectangular. A carriage 14 is displaceably guided in the housing 12 in the manner of a drawer. The carriage 14 is of tray-like construction, forming a drip basin for the collection of liquid spilling out from a beverage container inserted in the holding device 10. The carriage 14 is displaceable from the pulled-out position shown in FIGS. 1 and 2 to a position pushed into the housing 12 and vice-versa. Displacement into the pulled-out position is effected in a manner known per se by means of a spring element (not shown in the drawing). The carriage 14 is retained in the position pushed into the housing 12 against the force of the spring element by means of a locking device. The locking device is in the form of a cardioid or push-push mechanism, which can be unlocked by means of the fact that the carriage 14, which is pushed into the housing 12, is lightly pressed further into the housing 12. Such spring elements and locking devices will be familiar to the person skilled in the art and therefore will not be described in greater detail herein. Mounted on the carriage 14 is a multi-part holder 16, which is raised when the carriage 14 is pulled out and which, when the carriage 14 is pushed in, is lowered into the tray-like carriage 14. The holder 16 has two insertion openings 18 for inserting beverage containers such as, for example, beakers, cups or beverage cans. The insertion opening 18 surround more than 180° of the circumference of an inserted beverage container (not shown) so that the beverage container cannot tip over. The beverage container rests on the carriage 14.

Figure 3:
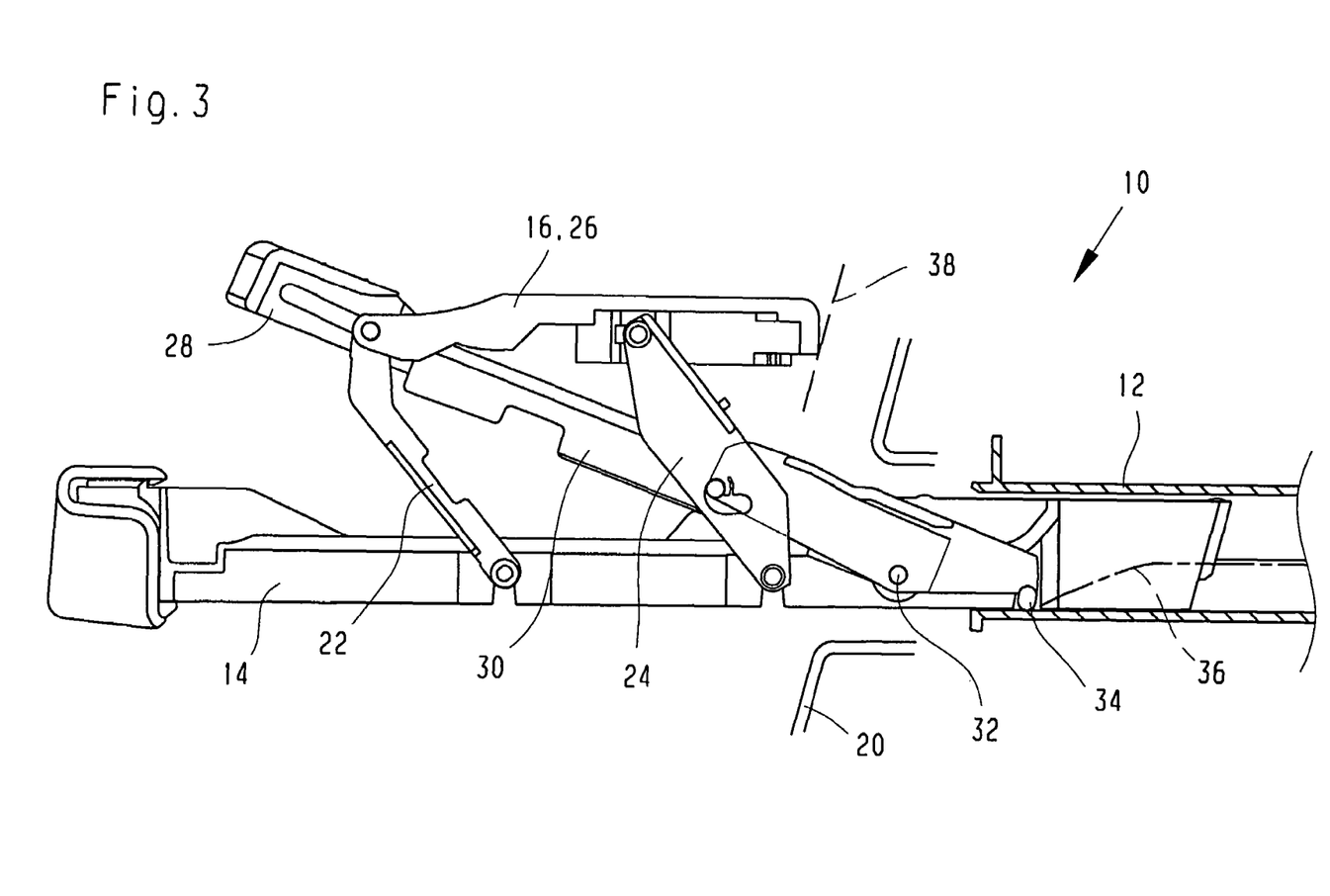
FIGS. 3–6 show side views of the holding device of FIG. 1 in various positions, the housing being shown in section.
Figure 4:
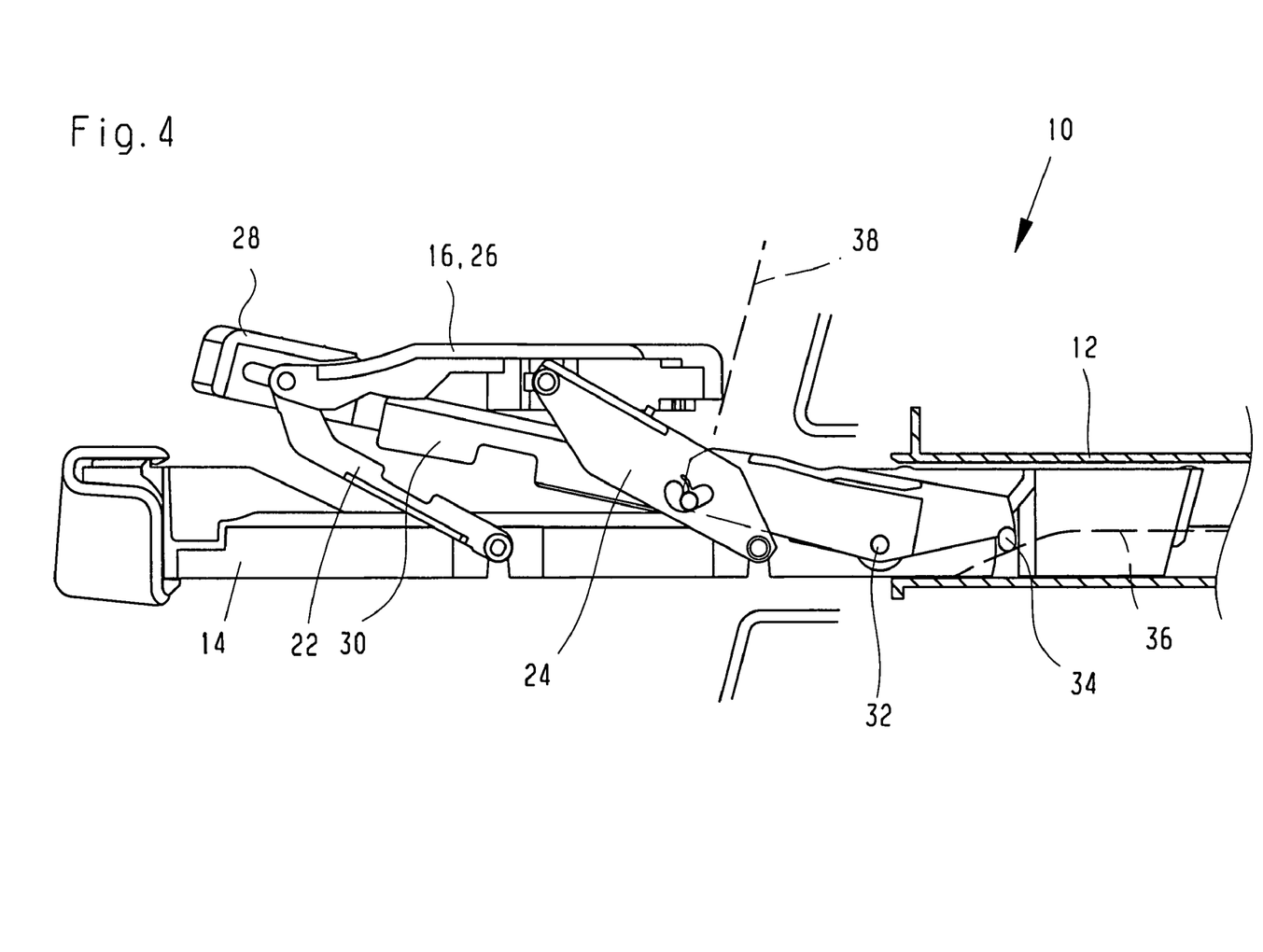
Figure 5:
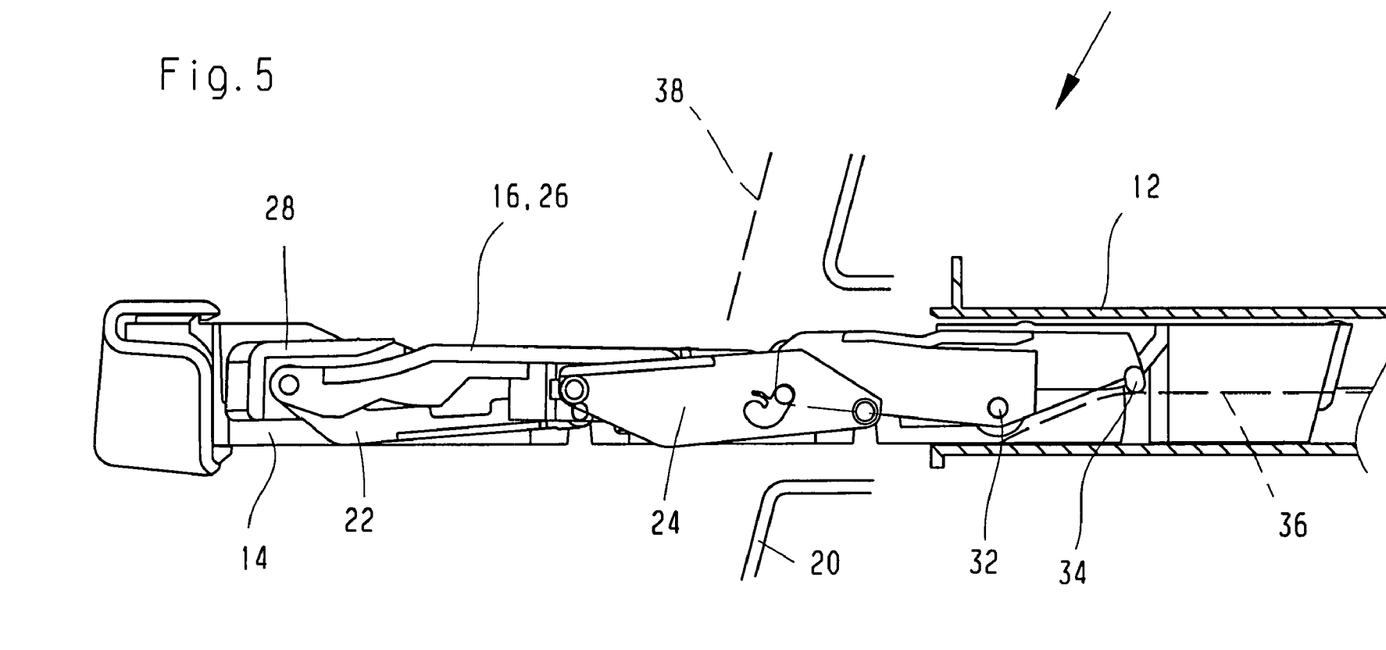
Figure 6:
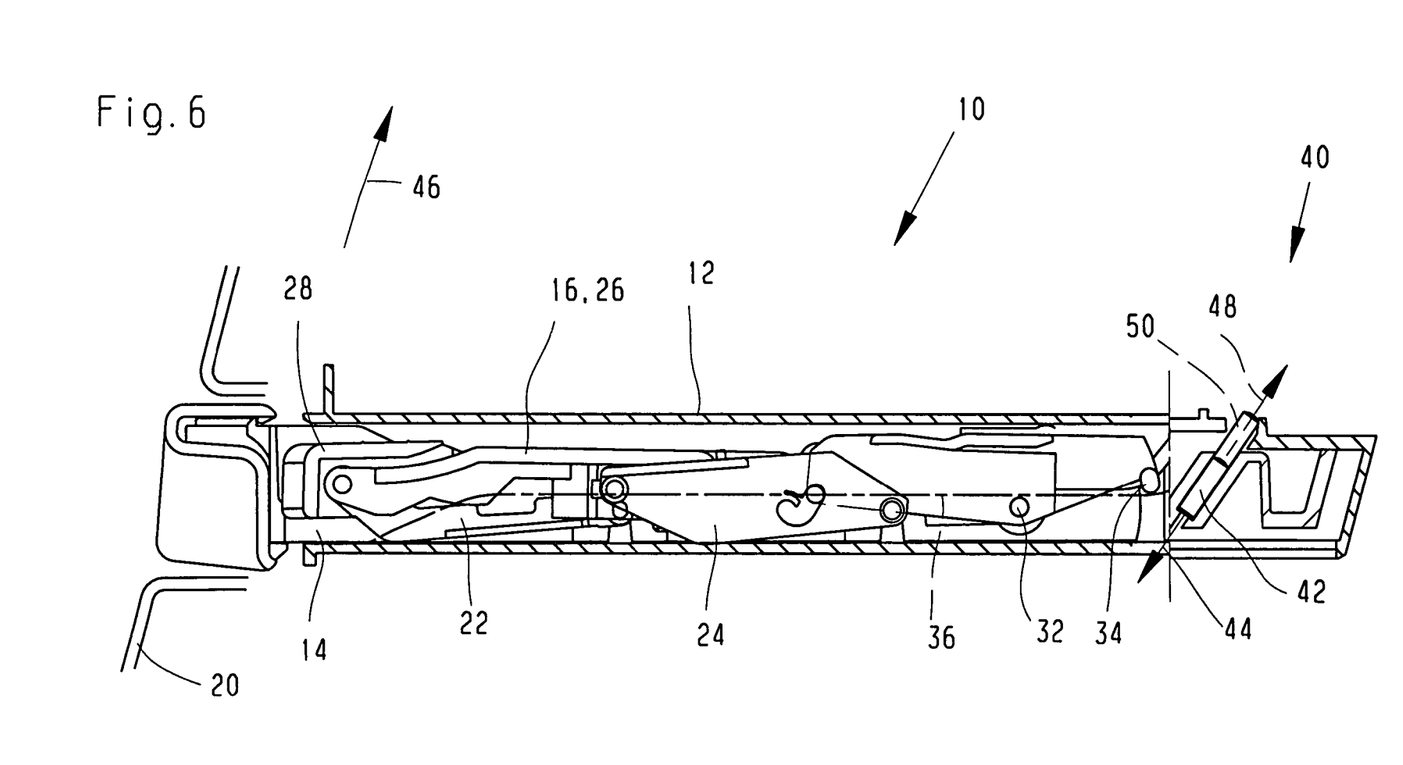

Raising and lowering of the holder 16 is explained herein below with reference to FIGS. 3–6, FIG. 3 showing the carriage 14 in the pulled-out position shown in FIGS. 1 and 2. FIG. 6 shows the carriage 14 in the position pushed into the housing 12. FIGS. 4 and 5 show intermediate positions of the carriage 14.

FIGS. 3–6 omit a side wall facing the viewer, of the carriage 14, in order to make visible a guide means for raising and lowering the holder 16. An arm rest 20 in a motor vehicle, in which arm rest 20 the holding device 10 according to the invention has been installed, is shown merely by way of indication in FIGS. 3–6, in the region of an opening for installation of the holding device 10.

As can be readily seen in FIG. 3, the holder 16 is connected to the carriage 14 by two levers 22, 24. At one end of the levers 22, 24 are pivotally connected to the carriage 14 and at another end area pivotally connected to the holder 16. In the illustrated exemplary embodiment of the invention, the levers 22, 24 are parallel to one another and of equal length and form a parallelogram guide means for the holder 16 on the carriage 14. Together with the carriage 14 and the holder 16, the levers 22, 24 form a four-lever mechanism. As shown in FIGS. 1 and 2, the levers 22, 24 are arranged in a central region of the carriage 14 and of the holder 16, the holding device 10 having two pairs of levers 22, 24 that are of like outline in side view and are arranged spaced apart next to one another; of those, only the levers 22, 24 facing the viewer are visible in FIGS. 3–6. A torsion spring element (not shown in the drawing) pivots the levers 22, 24 up and, as a result, raises the holder 16.

The holder 16 is of two parts; it has a rear part 26 and a front part 28. The front part 28 is approximately T-shaped in plan view, the shank 30 of the "T" extending between the levers 22, 2n4 and through into an opening in the housing 12 of the holding device 10. The front part 28 of the holder 16 is pivotally and displaceably connected to the rear part 26 of the holder 16 and a front lever 22 of the levers 22, 24. Close to the rearward end, the shank 30 of the T-shaped, front part 28 of the holder 16 is pivotalloy connected to the carriage 14. Reference numeral 32 denotes the pivotal connection. At the rearward end, the shank 30 has laterally projecting pins 34, which are displaceably guided on a ramp 36. The ramp 36 (shown in the drawing by broken lines) projects inward from side walls of the housing 12. The ramp 36 runs, from the base of the housing 12, first at an upward slant to a middle level of the housing 12 and the horizontally backwards to the rearward region of the housing 12. When the carriage 14 is pushed into the housing 12 from the pulled-out position shown in FIG. 3, the ramp 36 urges the pins 34 of the shank 30 upwards and as a result pivots the shank 30 down, as shown in FIGS. 4 and 5. In that manner, the holder 16 is lowered onto the carriage 14 as a result of pushing the carriage 14 into the housing 12. When the element 14 is pulled out from the housing 12, the above-mentioned torsion spring element (not shown) urges the holder 16 up into the raised position shown in FIGS. 1–3.

When the holder 16 is in the raised position, the levers 22, 24 guiding the holder 16 raisably on the carriage 16 stand up from the carriage 14 on a forward-pointing slant. On lowering of the holder 16 when the carriage 14 is being pushed into the housing 12, the levers 22, 24 pivot in a downward and also, in relation to the carriage 14, forward direction, that is to say in the pull-out direction of the carriage 14. As a result, when the holder 16 is being lowered, it is moved, relative to the carriage 12, in a forward direction contrary to the push-in direction of the latter, that is to say away from the housing 12 and the arm rest 20. FIGS. 3–5 show, by means of a broken line 38, the direction of movement of the holder 16 on lowering, at a rear edge of the holder 16. On lowering, the rear edge of the holder 16 moves at a downward and forward-pointing slant, that is to say contrary to the push-in direction of the carriage 14. The rear edge of the holder 16 moves parallel to an end face of the arm rest 20, until the holder 16 has been fully lowered onto the carriage 14, as shown in FIG. 5. There is consequently no change in spacing between the holder 16 and the end face of the arm rest 20 during lowering of the holder 16. As a result, it is possible for the holder 16 to be arranged spaced just a short distance from the end face of the arm rest 20. By that means, the pull-out distance of the carriage 14 and the length by which the carriage 14 projects out from the arm rest 20 in the pulled-out position are shortened.

At its rearward end, the carriage 14 has a gravity locking device 40, which is shown in FIG. 6. The gravity locking device 40 has a locking member in the form of a bolt 42 which is lodged displaceably within a cylindrical hole. The hole is arranged in a rearward region of the carriage 14 and is oriented at an angle of 45° with respect to the displacement direction of the carriage 14. When the carriage 14 is in the horizontal position as shown, gravity moves the bolt 42 in the hole in the carriage 14 at a downward slant in the direction of arrow 44. That is the unlocked position of the gravity locking device, wherein the carriage 14 is displaceable in the housing 12. When the arm rest 20 and, together with it, the holding device 10 according to the invention installed in the arm rest 20 are folded up by 90° or more in the direction of arrow 46, gravity moves the bolt 42 in the direction of arrow 48 indicated by a broken line. That displacement direction 48 of the bolt 42 is, when the arm rest 20 has been folded up, oriented on a downward slant, as is not difficult to see if the drawing sheet is rotated through 90° or more in the direction of arrow 46. In that locked position, the bolt 42, as indicated by broken lines, projects out from an upper face of the carriage 14 engages in an opening 50 in an upper face of the housing 12. By that means, the carriage 14 is locked immovably in the housing 12. When the arm rest 20 is folded back down into its horizontal position, gravity moves the bolt 42 back into its unlocked position (shown in solid lines), the bolt 42 comes out of engagement with the opening 50 in the housing 12 and the carriage 14 is displaceable in the housing 12.

Figure 7:
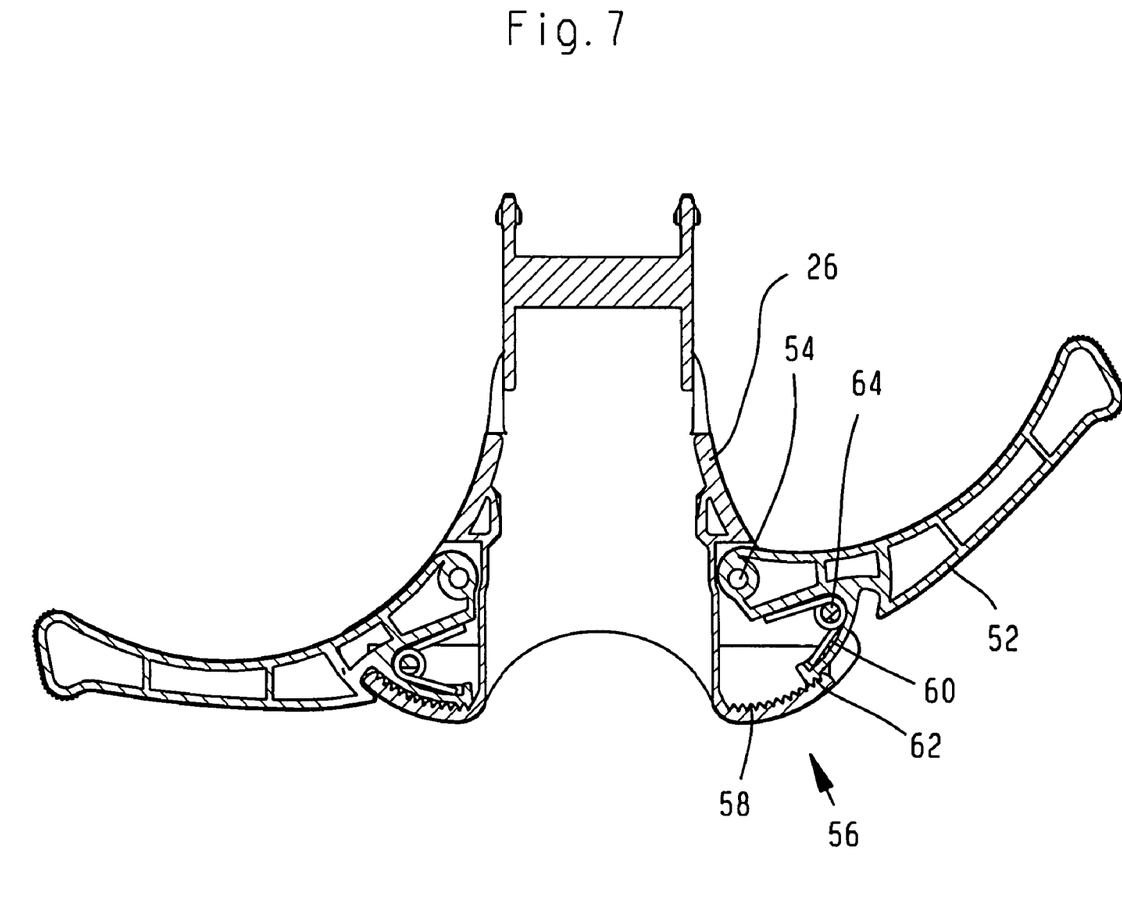
FIG. 7 shows a sectional view, from above, of a holding part of the holding device of FIG. 1.

The rear part 26 of the holder 16 has, on each side, a laterally projecting finger-like adjusting element 52. The adjusting element 52 is, as shown in FIG. 7, pivotally connected to the rear part 26 of the holder 16 by means of a pivot pin connection 54. FIG. 7 shows, in plan view, the rear part 26 of the holder cup 16, an upper face of the rear part 26 having a cut away in order to make visible the connection of the adjusting elements 52 to the rear part 26 of the holder 16. The adjusting elements 52 have a catch device 56, which secures them in their pivoted position. To catch device 56 has an internal tooth arrangement 58, which is integral with the rear part 26 of the holder 16. The internal tooth arrangement 58 is oriented on a region on an arc of a circle arranged concentrically around the pin connection 54. The adjusting element 52 has a spring tongue 60, from the free end of which there project teeth 62. Those teeth 62 are in engagement with the internal tooth arrangement 58 of the rear part 26 of the holder 16. The spring tongue 60 urges the teeth 62 resiliently into engagement with the internal tooth arrangement 58. The spring action of the spring tongue 60 is assisted by at torsion spring element 64 located inside it. The teeth 62 engaging in the internal tooth arrangement 58 secure the adjusting element 52 in its pivoted position. As a result of pressure of the adjusting element 52 in a tangential direction relative to the pivot pin connection 54, the teeth 64 can be brought out of engagement with the internal tooth arrangement 58 and the adjusting element 52 can be pivoted. As a result thereof, it is possible for the size of the insertion opening 18 to be modified and matched to different diameters of beverage containers.

It will be understood that each of the elements described above, or two or more together, may also find a useful application in other types of constructions differing from the types described above.

While the invention has been illustrated and described as embodied in a holding device for a beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holding device for a beverage container intended for installation in a holdable arm rest in a motor vehicle, the holding device comprising a carriage guidable as a drawer to be displaceable back and forth between a pushed-in position and a pulled-out position so that a beverage container can be inserted into the holding device when said carriage is in the pulled-out position; guide means for guiding said carriage during its displacement between said positions; a gravity locking device which is operative under the action of gravity and has a locking member which is displaceable under the action of gravity and locks said carriage in the pushed-in position when said carriage is not in an approximately horizontal position; a holder having an insertion opening for a beverage container, said holder being raisably guided on said carriage so that when said carriage is pulled out, said holder is raised and when said carriage is pushed in, said holder is lowered back onto said carriage, wherein said locking member is formed as a bolt which is located in the hole of said carriage and movable so as to engage into the opening of said housing when said carriage is pivoted into the position that is not approximately horizontal.

2. A holding device as defined in claim 1; and further comprising guide means for raisably guiding said holder on said carriage.

3. A holding device as defined in claim 2, wherein said guide means being formed so that a path of raising of said holder is oriented upwards in relation to said carriage and contrary to a pulled-out direction of said carriage, so that on pulling out said carriage, said holder travels no distance or at least a shorter distance in the carriage pulled-out direction than said carriage.

4. A holding device as defined in claim 2, wherein said guide means of said holder has a four-lever mechanism, said carriage forming one lever and said holder forming an opposite lever of said four-lever mechanism.

5. A holding device for a beverage container intended for installation in a holdable arm rest in a motor vehicle, the holding device comprising a carriage guidable as a drawer to be displaceable back and forth between a pushed-in position and a pulled-out position so that a beverage container can be inserted into the holding device when said carriage is in the pulled-out position; guide means for guiding said carriage during its displacement between said positions; a gravity locking device which is operative under the action of gravity and has a locking member which is displaceable under the action of gravity and locks said carriage in the pushed-in position when said carriage is not in an approximately horizontal position; a holder having an insertion opening for a beverage container, said holder being raisably guided on said carriage so that when said carriage is pulled out, said holder is raised and when said carriage is pushed in, said holder is lowered back onto said carriage.

6. A holding device as defined in claim 5, wherein said holder has an insertion opening for a beverage container, said holder also having an adjusting element which is movably mounted on said holder so that a size of said insertion opening is adjustable, said holder also having a securing device for said adjusting element so that said adjusting element can be secured in its position.

7. A holding device as defined in claim 6, wherein said securing device has a catch device.

8. A holding device as defined in claim 5, wherein said guide means is formed so that a path of raising said holder is oriented upwards in relation to said carriage and contrary to a pulled-out direction of said carriage, wherein on pulling out said carriage, said holder travels a short distance in the pulled-out direction of said carriage than said carriage travels.

9. A holding device for a beverage container intended for installation in a holdable arm rest in a motor vehicle, the holding device comprising a carriage guidable as a drawer to be displaceable back and forth between a pushed-in position and a pulled-out position so that a beverage container can be inserted into the holding device when said carriage is in the pulled-out position; guide means for guiding said carriage during its displacement between said positions; a gravity locking device which is operative under the action of gravity and has a locking member which is displaceable under the action of gravity and locks said carriage in the pushed-in position when said carriage is not in an approximately horizontal position; a holder having an insertion opening for a beverage container, said holder being raisably guided on said carriage so that when said carriage is pulled out, said holder is raised and when said carriage is pushed in, said holder is lowered back onto said carriage, wherein said locking member of said gravity locking device is displaceable at a slant relative to a direction of displacement of said carriage.

* * * * *